United States Patent
Littau et al.

(10) Patent No.: US 11,408,733 B2
(45) Date of Patent: Aug. 9, 2022

(54) METHOD AND DEVICE FOR MEASURING A LAYER THICKNESS OF AN OBJECT

(71) Applicant: iNOEX GmbH, Melle (DE)

(72) Inventors: Benjamin Littau, Oyten (DE); Giovanni Schober, Würzburg (DE); Stefan Kremling, Opferbaum (DE)

(73) Assignee: INOEX GMBH, Melle (DE)

( * ) Notice: Subject to any disclaimer, the term of this patent is extended or adjusted under 35 U.S.C. 154(b) by 385 days.

(21) Appl. No.: 16/610,723

(22) PCT Filed: May 2, 2018

(86) PCT No.: PCT/EP2018/061182
§ 371 (c)(1),
(2) Date: Nov. 4, 2019

(87) PCT Pub. No.: WO2018/202696
PCT Pub. Date: Nov. 8, 2018

(65) Prior Publication Data
US 2021/0156683 A1    May 27, 2021

(30) Foreign Application Priority Data
May 5, 2017 (DE) ............... 10 2017 207 648.8

(51) Int. Cl.
*G01J 5/02* (2022.01)
*G01B 15/02* (2006.01)

(52) U.S. Cl.
CPC ................... *G01B 15/02* (2013.01)

(58) Field of Classification Search
CPC ....... G01B 15/02; G01B 11/06; G01S 13/325; G01S 13/343; G01S 13/88
See application file for complete search history.

(56) References Cited

U.S. PATENT DOCUMENTS

| 2009/0251361 | A1* | 10/2009 | Beasley | .............. G01S 7/354 342/194 |
| 2015/0048843 | A1 | 2/2015 | Hinken | |
| 2015/0268218 | A1 | 9/2015 | Troxler | |

OTHER PUBLICATIONS

Huaqing Liang et al., Study on Signal Processing of FMCW Ground Penetrating Radar, Measuring Technology and Mechatronics Automation, 2009. ICMTMA '09. International Conference on, IEEE, Piscataway, NJ, USA, Apr. 11, 2009 (Apr. 11, 2009), pp. 528-531.

(Continued)

*Primary Examiner* — Kiho Kim
(74) *Attorney, Agent, or Firm* — McGlew and Tuttle, P.C.

(57) ABSTRACT

A method and device for measuring the layer thickness of an object. Initially, an object with a layer thickness is provided. Thereupon, at least two measurement steps are performed, where electromagnetic radiation with frequencies in a frequency band associated with the respective measurement step is radiated on the object in each case. The frequency bands are different portions of one bandwidth. Secondary radiation emanating from the boundary surfaces of the object is detected and a measurement signal associated with the measurement step is ascertained. The measurement signals are combined according to the respective frequency bands associated with the measurement steps in order to form an evaluation signal; a fundamental frequency is determined therefrom, and the layer thickness is calculated. A large bandwidth can be realized by a narrow-bandwidth measurement steps by the method. As a result, physical limits of known methods are overcome, and the measurement accuracy is increased.

15 Claims, 7 Drawing Sheets

(56) References Cited

OTHER PUBLICATIONS

Shah Dan I S et al., Simulation of frequency modulated continuous wave ground penetrating radar using Advanced Design System (ADS), Applied Electromagnetics (APACE), 2010 IEEE Asia-Pacific Conference on, IEEE, Nov. 9, 2010 (Nov. 9, 2010), pp. 1-5.

* cited by examiner

METHOD AND DEVICE FOR MEASURING A LAYER THICKNESS OF AN OBJECT

CROSS REFERENCE TO RELATED APPLICATIONS

This application is a United States National Phase Application of International Application PCT/EP2018/061182 filed May 2, 2018, and claims the benefit of priority under 35 U.S.C. § 119 of German Patent Application Serial No. DE 10 2017 207 648.8 filed May 5, 2017, the entire contents of which are incorporated herein by reference.

TECHNICAL FIELD

The present invention relates to a method and a device for measuring a layer thickness of an object, in particular an object made of plastic.

TECHNICAL BACKGROUND

Within the scope of industrial manufacturing, for example within quality control, it is often necessary to measure the exact layer thickness of an object. The layer thickness is an extent of the object between two boundary surfaces that are spaced apart. An example to this end is the wall strength of a pipe, which is manufactured from plastic in particular.

By way of example, terahertz measurement techniques with electromagnetic radiation are used for the thickness measurement. A possible approach lies in the use of pulsed measurement signals, wherein the layer thickness of the object can be deduced from measured time-of-flight differences. Alternatively, use can be made of continuous (CW) electromagnetic radiation, in particular frequency-modulated or phase-modulated electromagnetic radiation. Here, the electromagnetic radiation passing through the object experiences a phase shift. The phase difference resulting therefrom renders it possible to determine the layer thickness.

The resolution of such a measurement is restricted to the effect of it still being necessary to separate two time-offset signals in the propagation direction of the electromagnetic radiation. This time resolution depends on the spectral bandwidth of the electromagnetic radiation.

SUMMARY

It is an object of the present invention to develop a method for measuring a layer thickness of an object, said method being simple and accurate. In particular, the method should be performable in a cost-effective manner.

This object may be achieved by a method for measuring a layer thickness of an object, comprising the following steps: providing an object having two boundary surfaces that are spaced apart by a layer thickness, performing at least two measurement steps, wherein, in each case, electromagnetic radiation with frequencies in a frequency band associated with the respective measurement step is radiated on the object, wherein the frequency bands of the individual measurement steps are different portions of a bandwidth, and secondary radiation emanating from the boundary surfaces of the object is detected and a measurement signal is ascertained, combining the measurement signals of the measurement steps (according to the respective frequency bands in order to form an evaluation signal, and determining a fundamental frequency of the evaluation signal in order to calculate the layer thickness. Initially, an object having two boundary surfaces that are spaced apart by a layer thickness is provided. By way of example, the object is a pipe, more particularly a plastic pipe. Thereupon, at least two measurement steps are performed, wherein, in each case, electromagnetic radiation is radiated on the object and secondary radiation emanating from the boundary surfaces of the object is detected. A measurement signal is ascertained in each measurement step from the detected secondary radiation. The measurement signals of the measurement steps are combined in order to form an evaluation signal and a fundamental frequency is determined therefrom. The layer thickness can be calculated from the fundamental frequency.

The electromagnetic radiation radiated-in in the individual measurement steps is distinguished by frequencies in a frequency band associated with the respective measurement step. The frequency bands associated with the measurement steps are different portions of the bandwidth. In particular, the frequency bands have different mid-frequencies. Combining the measurement signals of the individual measurement steps is implemented depending on the respective frequency bands of the measurement steps. This means that the measurement signals are combined in accordance with the different portions of the bandwidth which are selected for the individual measurement steps. This is advantageous in that a measurement over the entire bandwidth can be approximated by individual measurement steps in portions of the bandwidth. In particular, the use of various frequency ranges can replace a measurement with broadband electromagnetic radiation without the resolution of the method deteriorating in relation to the measurement with broadband electromagnetic radiation. Consequently, conditions are provided for precise measurement using a plurality of cost-effective narrowband systems, such as transmitters and receivers for electromagnetic radiation. There is no need for expensive broadband systems. This reduces the construction outlay for performing the method according to the invention.

Moreover, the resolution, and hence the measurement accuracy, is not restricted by the bandwidth of individual measurement systems, which are often limited from a physical point of view. Consequently, the measurement accuracy may even be increased.

Secondary radiation within the meaning of the invention is understood to mean electromagnetic radiation that arises from reflection or transmission of the radiated-in radiation at the boundary surfaces of the object. Secondary radiation that passes through the object at least once experiences a phase shift. The measurement signal can be ascertained therefrom. To this end, it is possible, for example, to superpose secondary radiation components that are reflected from the different boundary surfaces of the object that are spaced apart by the layer thickness.

It may also be possible to produce the measurement signal by a superposition of the radiated-in radiation with the secondary radiation.

When the measurement signals of the individual measurement steps are combined, these are combined by calculation depending on the frequency band employed in the respective measurement step. In so doing, it is possible to take account of overlap and/or a frequency spacings between the individual frequency ranges. By way of example, provision can be made for the measurement signals to be plotted on a common frequency axis, depending on the respective frequency range. Then, the measurement signals plotted on the frequency axis can be fitted to determine the fundamental frequency. The fundamental frequency can be, in particular, a Fabry-Perot oscillation of the measurement signals occurring in the frequency space.

The method requires at least two measurement steps. More than two measurement steps may also be performed. The bandwidth can be better covered with an increasing number of measurement steps, i.e., with an increasing number of different frequency ranges. In addition or as an alternative thereto, a smaller frequency range can be chosen in each measurement step in the case of an increasing number of measurement steps. This renders systems only designed for narrow frequency bands employable, further reducing the construction outlay. However, it is also possible for the bandwidth covered by performing a plurality of measurement steps to be increased in order thus to further increase the measurement accuracy. Additionally, the fundamental frequency can be determined more accurately with increasing number of measurement steps. As a result of this, measurement uncertainties are reduced. The number of measurement steps and the respectively associated frequency bands can particularly preferably be fitted to the expected evaluation signal according to the Nyquist-Shannon sampling theorem.

The individual measurement steps are carried out independently of one another. Thus, the measurement steps can either be performed sequentially in time or simultaneously. Carrying out the individual measurement steps at the same time offers the advantage of a fast measurement. By contrast, a measurement sequentially in time allows the electromagnetic radiation to be radiated on the same region of the object in the individual measurement steps. By way of example, this renders an accurate resolution of local layer thickness differences possible. In particular, there can be sliding tracking of the layer thickness.

The radiation is radiated-in continuously, quasi-continuously or in the form of radiation pulses in the individual measurement steps. Depending on the type of electromagnetic radiation radiated-in, provision can be made for the measurement signal to be ascertained from the detected secondary radiation in different ways. By contrast, combining the measurement signals only depends on the frequency bands employed in the respective measurement steps. Therefore, different methods for determining the measurement signals from the detected secondary radiation may also be used in various measurement steps. By way of example, provision can be made for pulsed electromagnetic radiation to be used in one measurement step, whereas work is carried out with quasi-continuous radiation in other measurement steps.

In general, the electromagnetic radiation is radiated on the object under an angle of incidence b. The angle of incidence b is defined as the angle between the propagation direction of the electromagnetic radiation and the surface normal of the boundary surface of the object facing a transmitter for the electromagnetic radiation. An angle of incidence b=0° means perpendicular incidence of the radiation on the boundary surface of the object. An angle of incidence b≠0° is referred to as oblique incidence.

The electromagnetic radiation radiated on the object is refracted at the boundary surface facing the transmitter. Therefore, the electromagnetic radiation propagates in the object at a propagation angle e, said propagation angle being calculated from the refractive index of the object and the angle of incidence b according to Snell's law.

In the case of an oblique incidence, the radiated-in radiation must travel a greater distance between the boundary surfaces of the object. This must be taken into account when ascertaining the measurement signals and calculating the layer thickness. The measurement is preferably performed with perpendicular incidence.

When carrying out a measurement with pulsed electromagnetic radiation, the layer thickness is determined by measuring the times-of-flight of the radiation pulses. A radiation pulse is described by a wave packet in time and frequency space about the mid-frequency. The shorter the radiation pulse, the more accurately the layer thickness can be resolved. Short radiation pulses correspond to a broadband signal. The generation of extremely short radiation pulses requires expensive transmitters.

A method, wherein the electromagnetic radiation is radiated on the object in pulsed fashion in at least one of the measurement steps, allows the layer thickness to be measured with radiation pulses with longer pulse durations. Individual pulses or a plurality of successively radiated-in pulses can be used in the case of pulsed incoming radiation. In all cases, a frequency range can be associated with the radiation radiated-in in one measurement step.

The measurement signals of the individual measurement steps are preferably combined in such a way that the frequency bands are plotted on a common frequency axis in accordance with the respective mid-frequency. The fundamental frequency, to be determined, for calculating the layer thickness then corresponds to a Fabry-Perot oscillation in frequency space.

In the limit case, the pulse durations can be chosen to be so long that quasi-continuous radiation with a fixed mid-frequency is radiated-in. In this case, the frequency band associated with a measurement step substantially corresponds to the mid-frequency of the quasi-continuous radiation. Rather than using a time-of-flight measurement, the measurement signal can be determined by an interference measurement.

A method, wherein the frequency of the electromagnetic radiation is modulated over time according to a function in at least one of the measurement steps, wherein the function maps the frequency band of the respective measurement step onto a time window, facilitates the measurement with frequency-modulated continuous radiation with a small frequency deviation. Here, the frequency deviation is defined by mapping the frequency band onto a time window by means of a function. Instead of a single large frequency deviation over the entire bandwidth, the function only needs to map a narrow frequency band in the individual measurement steps. The function is preferably monotonically increasing, particularly preferably linearly increasing over the time window.

On account of the functional relationship between the frequency band and the associated time window, combining the measurement signals of the individual measurement steps corresponds to plotting the measurement signals over a common time axis.

A method, wherein a phase of the electromagnetic radiation radiated-in is modulated over time according to a function in at least one of the measurement steps, allows the method to be performed using systems for the phase-modulated measurement. In the phase-modulated measurement, the electromagnetic radiation is phase-modulated about the mid-frequency associated with the respective measurement step. The function according to which the radiation is phase-modulated is also referred to as a modulation code. The frequency band associated with the measurement step is determined from the mid-frequency and the time duration of the modulation code by way of a Fourier transform. In the case where the electromagnetic radiation is radiated-in in phase-modulated fashion in a plurality of measurement steps, the same modulation code can be used in each case with different mid-frequencies.

An advantage of the method, wherein the frequency bands of the individual measurement steps do not overlap, is that the bandwidth is covered effectively. Redundancies of the individual measurement steps and difficulties connected therewith when combining the measurement signals are avoided. The method is performable in effective and time-saving fashion.

A bandwidth mid-frequency in the range of 50 GHz to 1500 GHz, preferably of 1000 GHz allows a large frequency range to be covered, in particular a frequency range from 0.01 THz to 3 THz, more particularly from 0.2 THz to 2 THz. Electromagnetic radiation in this frequency range can easily penetrate the objects to be measured, in particular objects made of plastic. Absorption losses are reduced or avoided. Moreover, effective, more particularly fully electronic transmitters exist in this frequency range. The method is effective and accurate.

The bandwidth chosen allows the method according to the invention to be adapted to the properties of the object to be measured, in particular to the refractive index n thereof, and to a smallest layer thickness $d_{min}$ to be measured. Alternatively, the smallest layer thickness $d_{min}$ to be measured, i.e., the maximum resolution, can easily be specified for a measuring device with a known bandwidth. The method is simple and precise.

The bandwidth B $$B \geq \frac{c \cos e}{2 d_{min} n},$$

where c is the speed of light in vacuo, n is the refractive index of the object, e is a propagation angle at which the electromagnetic radiation propagates within the object and $d_{min}$ is the smallest layer thickness to be measured, applies to reflection measurements in which the radiation passes twice through the layer thickness of the object to be measured. For transmission measurements, it is necessary to choose a bandwidth B adapted to the transmission measurement.

By way of example, the bandwidth can be between 50 GHz and 500 GHz, in particular between 100 GHz and 250 GHz, more particularly between 150 GHz and 200 GHz. By way of example, should a reflection measurement under perpendicular incidence of the electromagnetic radiation be used to measure smallest layer thickness to be measured of $d_{min}$=0.66 mm, with the object to be measured having a refractive index of n=1.5, the minimum required bandwidth is approximately B=160 GHz.

A method, wherein the following applies to each frequency range Δf that does not belong to any frequency band of a measurement step within the bandwidth B:

$$\Delta f < \frac{c \cos e}{2 d_{max} n},$$

where c is the speed of light, n is the refractive index of the object, e is a propagation angle at which the electromagnetic radiation propagates within the object and $d_{max}$ is the greatest layer thickness to be measured, satisfies the Nyquist-Shannon sampling theorem. The frequency ranges of the individual measurement steps need not cover the entire bandwidth. This allows the measurement steps to be performed to be minimized without reducing the measurement accuracy. The method is adaptable to the object to be measured, more particularly to the greatest layer thickness $d_{max}$ thereof to be measured.

The relationship between the frequency range Δf, the greatest layer thickness $d_{max}$ to be measured and the refractive index n, $$\Delta f < \frac{c \cos e}{2 d_{max} n},$$

applies to reflection measurements. For transmission measurements, in which the electromagnetic radiation only passes through the object once, the formula for the frequency range Δf must be adapted accordingly.

If the maximum layer thickness to be measured by reflection measurement is $d_{max}$=6.66 mm, the frequency spacing Δf at perpendicular incidence must be chosen as no more than 10 GHz.

A method, wherein respectively one transmitter for emitting electromagnetic radiation in the respective frequency band and respectively one receiver for the secondary radiation are provided for carrying out each measurement step, is particularly well-suited to performing the measurement steps at the same time. The method is fast and effective. Moreover, only transmitters for electromagnetic radiation in a respectively predetermined frequency band are necessary. These are cheap and reliable. The construction outlay for the method is reduced. Preferably, respectively one receiver for the secondary radiation is present for the purposes of performing each measurement step. The method is easily adaptable and/or retrofittable by exchanging the respective transmitters and receivers. Preferably, the calibration step may be carried out only once, prior to the first measurement.

A method, wherein the transmitters are calibrated before the measurement, is advantageous in that the transmitters for performing the individual measurement steps can be selected and operated completely independently of one another. The transmitters for the electromagnetic radiation of different frequencies need not have any fixed amplitude or phase relationship. The calibration is preferably implemented by a measurement using a known calibration body, in particular a metal mirror, wherein the secondary radiation emanating from the calibration body serves to normalize the amplitude and phase of the transmitters. The calibration facilitates a free selection of the transmitters, without impairing the measurement accuracy.

In particular, the actuation of the transmitters in synchronized fashion is implemented in such a way that the various transmitters are actuated with a fixed phase relationship and operate at identical amplitudes. The synchronized actuation of the transmitters can be implemented by way of a reference oscillator, for example. A calibration can be dispensed with in the case of the synchronized actuation.

A further object of the invention lies in improving a device for measuring the layer thickness of an object.

This object may be achieved by a device for measuring the layer thickness of an object, comprising: at least two transmitters for emitting electromagnetic radiation with, in each case, frequencies in a set frequency band, wherein the frequency bands of the individual transmitters are different portions of a bandwidth, at least one receiver for electromagnetic radiation with frequencies within the bandwidth, and evaluation electronics, wherein the evaluation electronics are designed to perform a measurement method comprising the following steps: performing a measurement step by each transmitter, wherein, in each case, electromagnetic radiation in the respective frequency band is radiated on the object by means of the respective transmitter, secondary radiation emanating from two boundary surfaces of the object that are spaced apart by a layer thickness is detected as a measurement signal by means of the receiver, and combining the measurement signals of the measurement steps according to the respective frequency bands in order to form an evaluation signal, and determining a fundamental frequency of the evaluation signal in order to calculate the layer thickness. The device comprises at least two transmitters for emitting electromagnetic radiation with, in each case, frequencies in a set frequency band. The frequency bands of the individual transmitters represent different portions of the bandwidth. Moreover, provision is made of at least one receiver for electromagnetic radiation with frequencies within the bandwidth, and evaluation electronics. The evaluation electronics are designed to perform the above-described method.

The device is advantageous in that it is possible to cover a broader bandwidth without the provision of expensive transmitters and/or receivers for emitting broadband signals. The device facilitates an accurate measurement.

The device is designed to perform a method having at least two measurement steps. A dedicated transmitter can be provided for each measurement step. However, the individual transmitters can also each be designed for performing a plurality of measurement steps. Tunable transmitters, in particular, can be considered to this end.

Particularly preferably, one receiver for electromagnetic radiation with frequencies within the respective frequency band is provided for each transmitter. This allows a plurality of measurement steps to be performed at the same time. The transmitters and the respective receivers may also be combined to form a transceiver unit, more particularly comprise the same components like a radar antenna, for example.

The further advantages of the device correspond to those of the above-described method. Moreover, the evaluation electronics can be designed to perform a calibration step prior to the measurement.

The calibration of the transmitters, wherein the transmitters are coupled by way of a synchronization unit, can be dispensed with in a device according to the invention. The measurement accuracy of the device is increased.

A device, wherein the evaluation electronics comprise an interface for entering properties of the object, in particular a refractive index, a maximum layer thickness and/or a minimum layer thickness, facilitates the adaptation of the method performable with the device to the properties of the object to be measured. In particular, the refractive index, the maximum layer thickness and/or the minimum layer thickness of the object can be taken into account here. The properties of the object can be entered by hand or automatically via a data interface. By way of example, provision can be made for the properties of the object, more particularly setpoint values, to be forwarded from an upstream production unit to the device for measuring the layer thickness.

In particular, a frequency range that within the bandwidth is not part of any frequency band of any measurement step can be determined from the data transmitted to the evaluation electronics via the interface. In particular, provision can be made for such a frequency range not to exceed a certain maximum value. Moreover, the bandwidth to be covered by the transmitters can be adapted to a minimum thickness to be measured.

A device comprising a modular design, in particular for matching the number of transmitters and receivers to the bandwidth, allows simple converting or upgrading. Hence, the device and the measuring method can be adapted to very different objects to be measured. Procuring a new device in the case of modified measuring conditions is avoided. This minimizes the construction outlay.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
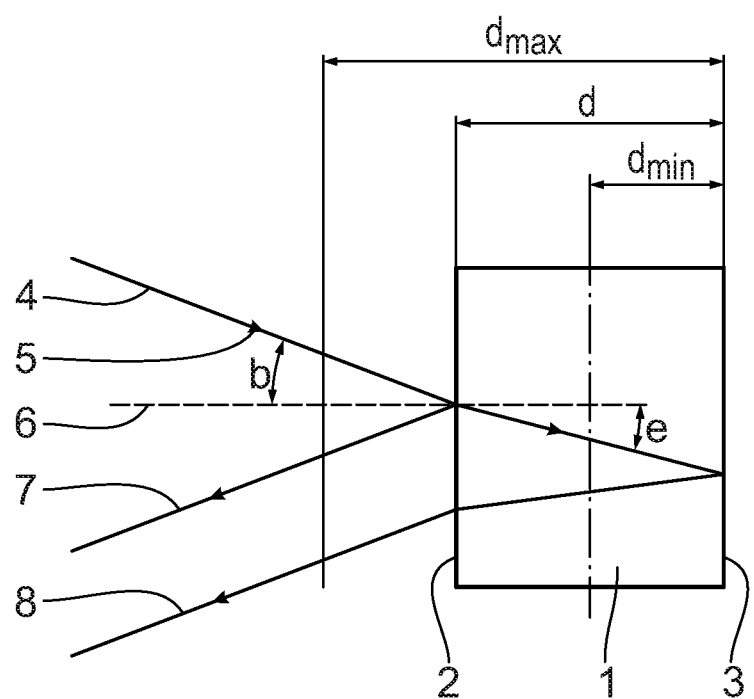
FIG. 1 is a schematic view of a measurement of the layer thickness of an object.

FIG. 1 schematically shows the measurement of a layer thickness d of an object 1. The object 1 has boundary surfaces 2, 3, which are spaced apart by the layer thickness d. The layer thickness d of the object 1 varies in the range between the minimum layer thickness $d_{min}$ and the maximum layer thickness $d_{max}$ The minimum layer thickness $d_{min}$ and the maximum layer thickness $d_{max}$ represent a smallest and greatest layer thickness to be measured, respectively, for the measurement. The object 1 has a refractive index n, which deviates from the refractive index of the surroundings of the object 1. The measurement is usually performed in air or in vacuo, and so the refractive index of the surroundings is 1.

For the purposes of measuring the layer thickness d of the object 1, electromagnetic radiation 4 is radiated on the boundary surface 2 of the object 1 at an angle of incidence b. The angle of incidence b is defined as the angle between a propagation direction 5 of the electromagnetic radiation 4 and a surface normal 6 of the boundary surface 2. The radiated-in electromagnetic radiation 4 is reflected in part at the boundary surface 2 as reflection radiation 7. The non-reflected component of the electromagnetic radiation 4 penetrates into the object 1 and propagates there in the direction of the boundary surface 3 at a propagation angle e with respect to the surface normal 6. The propagation angle e differs from the angle of incidence b on account of the refraction of electromagnetic radiation 4 at the boundary surface 2. The propagation angle e can be calculated according to Snell's law of refraction. The following applies:

$$\sin b = n \sin e. \quad (1)$$

The radiation that has penetrated into the object 1 is at least partly reflected at the boundary surface 3 and, at the boundary surface 2, said radiation emerges from the object 1 as emergence radiation 8. The reflection radiation 7 and the emergence radiation 8 represent secondary radiation emanating from the boundary surfaces 2, 3 of the object 1. A measurement signal can be determined from the secondary radiation 7, 8, from which it is possible to calculate the layer thickness d of the object 1. To this end, the reflection radiation 7 can be superposed on the emergence radiation 8 and can be evaluated.

The obtainable resolution is determined from the spectral bandwidth B of the radiated-in electromagnetic radiation 4.

The object 1 is a plastic component, for example a plastic pipe. The bandwidth B has a bandwidth mid-frequency $f_M$ of approximately 1000 GHz. Plastic components are easily penetrated by electromagnetic radiation in the gigahertz range. The plastic components are transparent. The object 1 is manufactured from different materials in further exemplary embodiments. The bandwidth mid-frequency $f_M$ of the bandwidth B can be adapted to the material of the object 1. By way of example, the bandwidth mid-frequency $f_M$ can be chosen between 50 GHz and 1500 GHz.

In order to be able to resolve object 1 with a layer thickness $d_{min}$, the electromagnetic radiation 4 must cover a bandwidth B, to which the following applies:

$$B \geq \frac{c \cos e}{2 d_{min} n}, \quad (2)$$

where c is the speed of light in vacuo. If the intention now is to resolve an optical path length n $d_{min}$=1 mm, this requires a bandwidth of no less than 150 GHz in the case of perpendicular incidence. The bandwidth of known devices and methods for measuring the layer thickness d are not only limited from a physical point of view but the corresponding transmitters and receivers are also very expensive. Methods which replace the measurement with a great bandwidth B by a plurality of measurement steps $M_i$ are described below. The index i, i=1, 2, . . . , enumerates the individual measurement steps $M_i$.

A first exemplary embodiment of the method for measuring the layer thickness d of the object 1 is described with reference to FIGS. 2 to 5. The method exploits frequency-modulated electromagnetic radiation 4.

Figure 2:
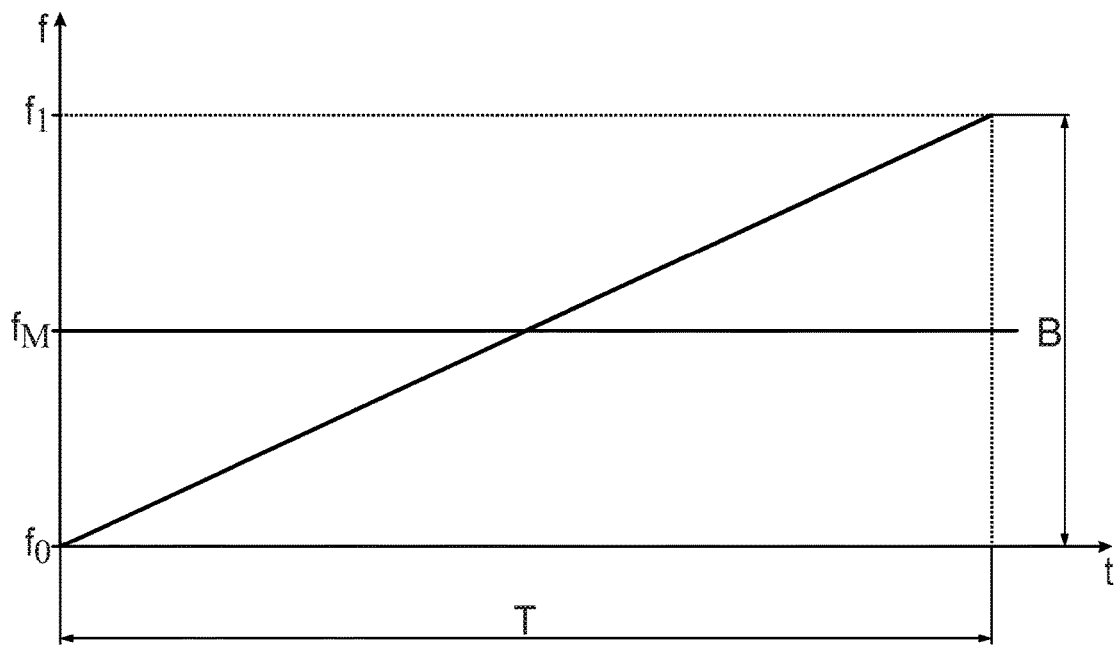
FIG. 2 is a view of a frequency of electromagnetic radiation, which is subject to linear frequency modulation over a large bandwidth in a manner known per se.

FIG. 2 illustrates a known modulation for electromagnetic radiation 4, as used in frequency-modulated radar measurements. To this end, the frequency f of the electromagnetic radiation 4 is plotted over time t. The frequency f is varied from a minimum frequency $f_0$ to maximum frequency $f_1$ over a measurement duration T by virtue of the frequency f increasing within the measurement duration T along a linear function f(t) over time t. The function f(t) represents the frequency deviation of the measurement duration T. Following the measurement duration T, the frequency f jumps back to the minimum frequency $f_0$ again. The spectral bandwidth B is defined between the minimum frequency $f_0$ and the maximum frequency $f_1$. The bandwidth B is defined around the bandwidth mid-frequency $f_M$.

Figure 4:
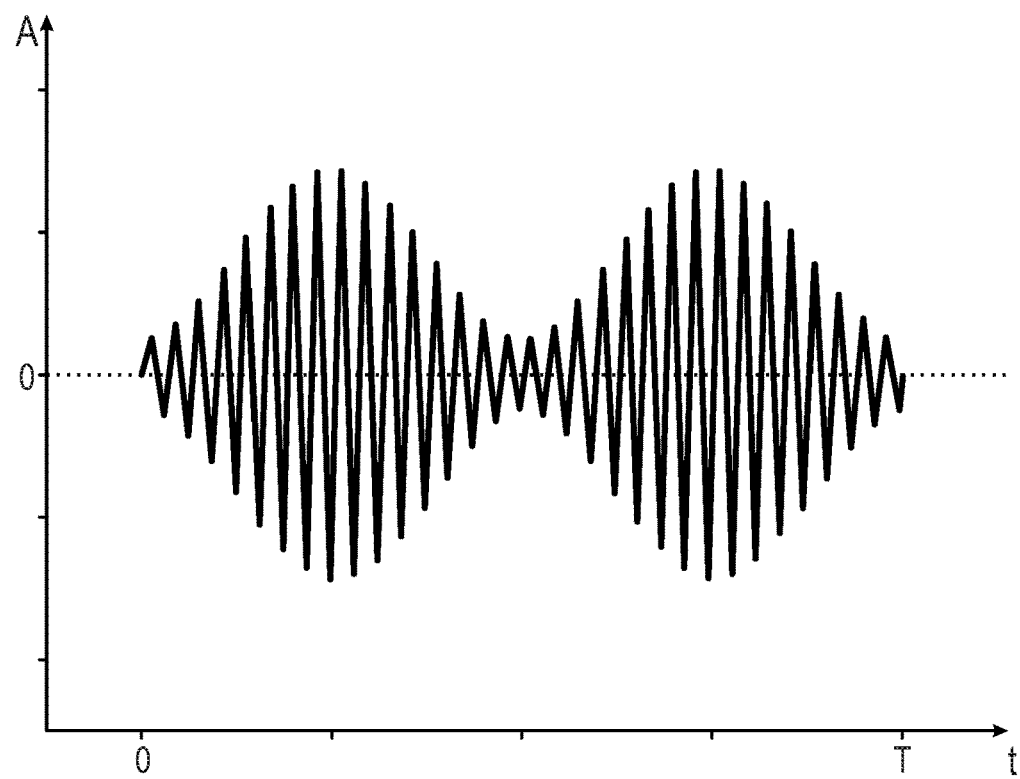
FIG. 4 is a view of an evaluation signal that is obtained by a measurement using the radiation that has been frequency modulated in accordance with FIG. 2.

The reflection radiation 7 emanating from the first boundary surface 2 of the object 1 is superposed by the emergence radiation 8 emanating from the second boundary surface 3. On account of the different times-of-flight of the respective secondary radiation 7, 8, there is a measurement signal A of amplitude $$A \propto \cos\left[\frac{\Delta\omega_1 + \Delta\omega_2}{2}t\right] \cos\left[\frac{\Delta\omega_1 - \Delta\omega_2}{2}t\right], \quad (3)$$

where $\Delta\omega_1$ and $\Delta\omega_2$ are the frequencies associated with the respective boundary surfaces 2, 3. On account of the linear variation in the frequency of the radiated-in radiation 4, a beat in the amplitude arises, as illustrated in FIG. 4. To this end, FIG. 4 illustrates the amplitude of the measurement signal A as a function of time t over the measurement duration T. Since the fundamental frequency $\omega 0$ of the beat $$\omega 0 = (\Delta\omega 1 - \Delta\omega 2)/2 \quad (4)$$

is proportional to the frequency difference between the reflection radiation 7 and the emergence radiation 8, the layer thickness d of the object 1 can be determined herefrom:

$$d = \frac{\omega 0}{k} \frac{c}{n} \cos e, \quad (5)$$

where k is the gradient of the linear function f(t).

The measurement signal A can be used directly to calculate the layer thickness d; i.e., it represents an evaluation signal. In order to ensure a resolution of the layer thickness d, the frequency variation of the bandwidth B must therefore cover at least half the period length of the fundamental frequency of the beat.

Figure 3:
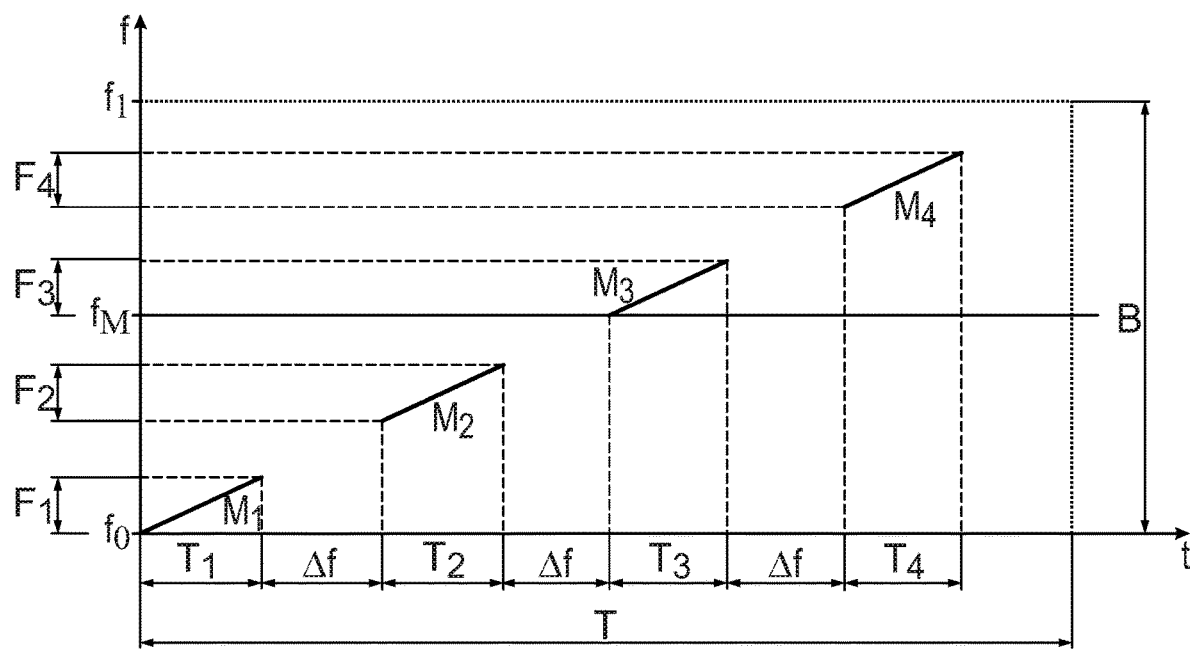
FIG. 3 is a view of a frequency of electromagnetic radiation linearly modulated according to the invention in a plurality of measurement steps over discrete, narrowband frequency bands.

FIG. 3 now illustrates the measurement signals of four measurement steps $M_i$, i=1, 2, 3, 4. In each measurement step $M_i$, electromagnetic radiation 4 is modulated over time t according to a function $f_i(t)$, wherein the function $f_i(t)$ maps a frequency band $F_i$ associated with the respective measurement step $M_i$ to a time window $T_i$. The frequency bands F are portions of the bandwidth B. The functions $f_i(t)$ are linearly monotonically increasing. The functions $f_i(t)$ cover portions of the frequency deviation f(t), shown in FIG. 2, of the bandwidth B. The frequency bands F do not overlap and do not cover the bandwidth B completely.

Figure 5:
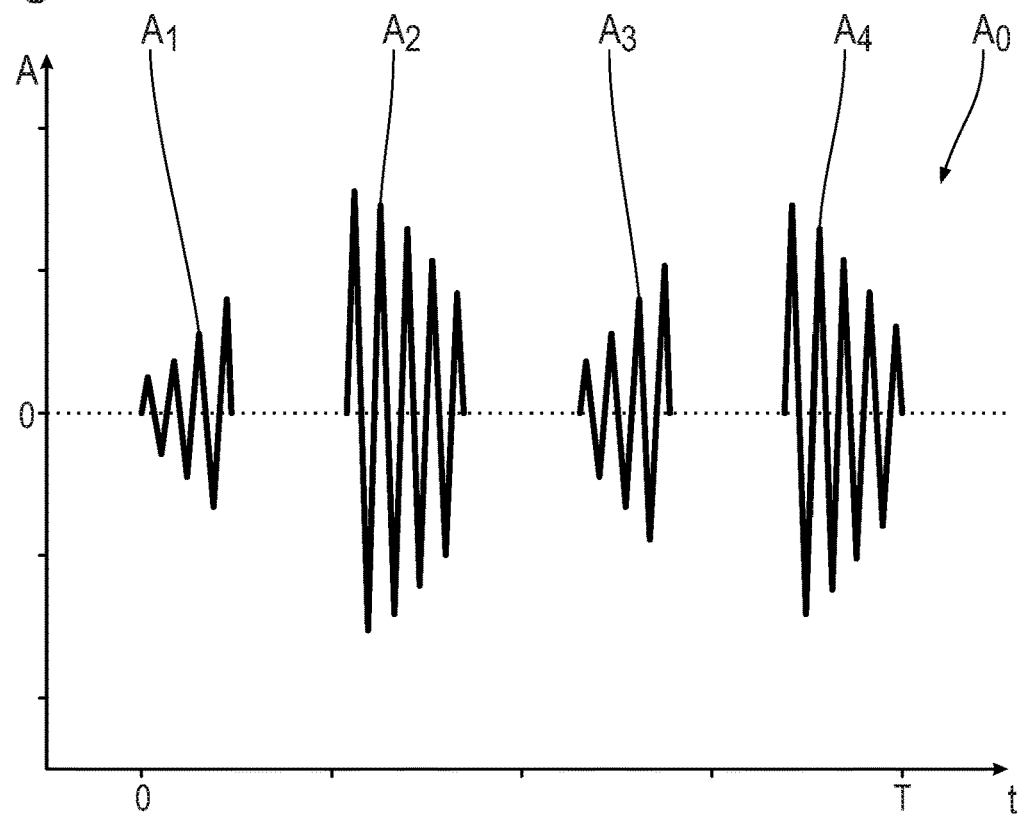
FIG. 5 is a view of an evaluation signal that is obtained by performing the measurement steps that have been frequency modulated in accordance with FIG. 3.

The amplitude of the measurement signal $A_i$ can be calculated in each case from the secondary radiation 7, 8 detected in the individual measurement steps $M_i$. On account of the short length of the time windows $T_i$, the respective measurement signals $A_i$ only cover part of the beat (cf., FIG. 3). However, it is possible to combine the amplitudes of the measurement signals $A_i$ of the individual measurement steps $M_i$, as shown in FIG. 5. To this end, the measurement signals $A_i$ of the individual measurement steps $M_i$ are combined in accordance with the respective frequency band $F_i$ in order to form an evaluation signal $A_0$. In the case of the frequency-modulated measurement, it is possible to implement a combination of the measurement signals $A_i$ over the measurement duration T along the time axis t from the position of the respective frequency bands $F_i$. The fundamental frequency $\omega_0$ of the evaluation signal $A_0$ can be determined from the combined measurement signals A of the measurement steps $M_i$ by fitting or approximating a beat function, and the layer thickness d can be calculated therefrom.

As illustrated in FIG. 3, the frequency bands $F_i$ do not cover the entire bandwidth B. Since the fundamental frequency $\omega_0$ is proportional to the layer thickness d, the beat frequency increases with increasing layer thickness d. According to the Nyquist-Shannon sampling theorem, at least two sampling points are required per period of the fundamental frequency $\omega_0$ in order to uniquely determine the fundamental frequency $\omega_0$. In order to be able to determine the greatest layer thickness $d_{max}$ to be measured, it is therefore necessary to choose frequency ranges $\Delta f$ which do not belong to any of the frequency bands F of any measurement step $M_i$ within the bandwidth B to be small enough in order to facilitate a unique reconstruction of the fundamental frequency $\omega_0$. To this end, the frequency range $\Delta f$ must satisfy the following condition:

$$\Delta f < \frac{c \cos e}{2 d_{max} n}. \qquad (6)$$

The individual measurement steps $M_i$ are performed independently of one another. The measurement steps $M_i$ can be performed at the same time or in succession. The simultaneous performance has the advantage of a fast and effective measurement. The measurement in succession allows the electromagnetic radiation 4 to be radiated on the same point of the boundary surface 2 of the object 1 in every measurement step $M_i$. This allows a spatially highly resolved measurement of the layer thickness d. In particular, it is possible to track a spatial change in the layer thickness d.

In further exemplary embodiments, not illustrated, more or fewer measurement steps M can be performed. In particular, provision can be made for only two measurement steps $M_i$ to be performed. The frequency bands F. of the individual measurement steps $M_i$ can also overlap. In further exemplary embodiments, the frequency bands $F_i$ cover the entire bandwidth B.

The evaluation signal $A_0$ can equivalently also be analyzed in frequency space. There, the evaluation signal $A_0$ is composed of two pulses. The first pulse corresponds to the fundamental frequency $\omega_0$, the second pulse corresponds to the harmonic of the beat. The width of the pulses is inversely proportional to the spectral bandwidth B, and so the pulses can only be separated in time in the case of a correspondingly large bandwidth B. Then, the position of the pulse of the fundamental frequency $\omega_0$ can be directly converted into the layer thickness d.

Figure 6:
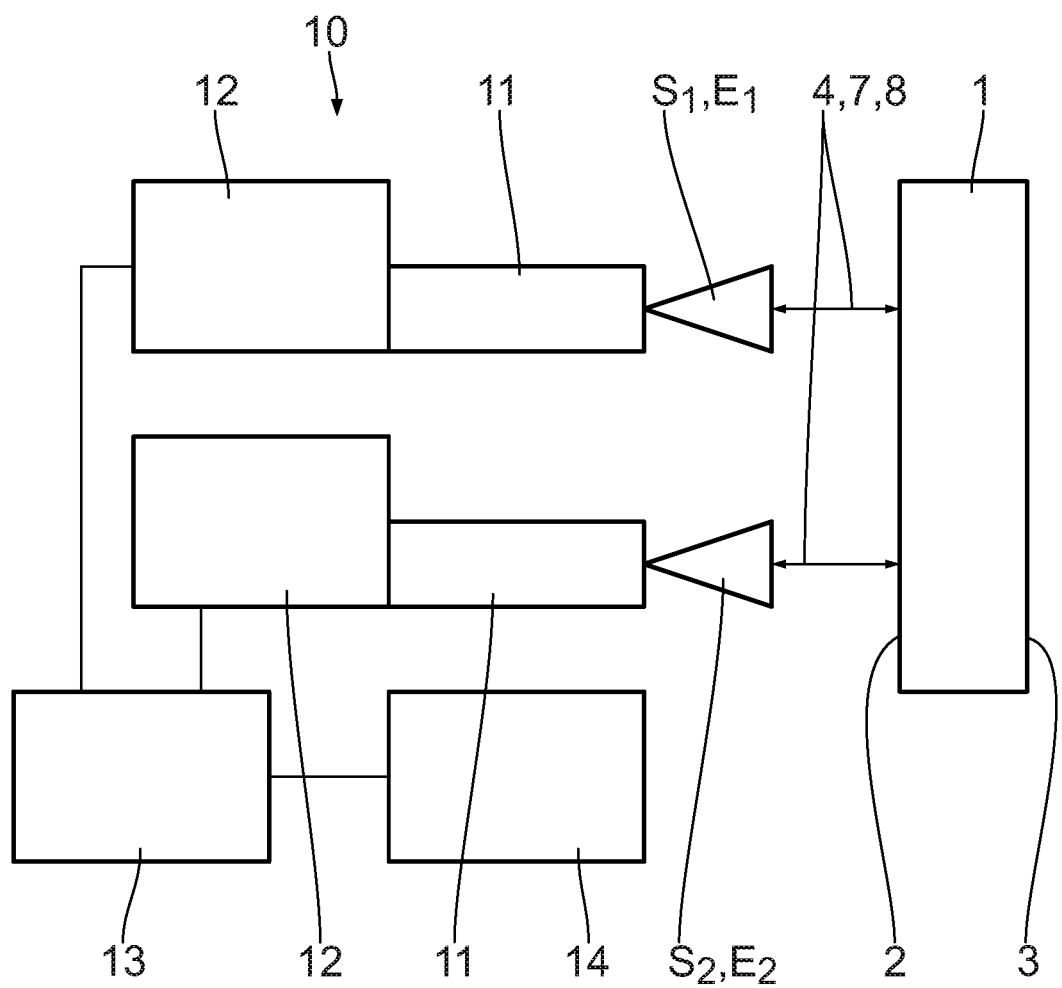
FIG. 6 is a view of a device for measuring a layer thickness of an object.

FIG. 6 shows a measurement setup for performing the measurement method described. The measurement setup comprises the object 1 with the boundary surfaces 2, 3, and a measuring device 10. The measuring device 10 comprises two transmitters $S_1$ and $S_2$ for electromagnetic radiation 4 in a frequency band $F_1$ and $F_2$, respectively. Moreover, two receivers $E_1$ and $E_2$ are present for the secondary radiation 7, 8 in the respective frequency bands $F_1$ and $F_2$. In the measuring device 10, the transmitters $S_i$ and the receivers E are combined to form a transceiver unit 11 in each case. The transceiver units 11 with the respective transmitters $S_i$ and receivers $E_i$ are radar antennas that can emit frequency-modulated continuous electromagnetic radiation 4 and can receive the corresponding secondary radiation 7, 8, which is reflected by the object 1. A control and data processing unit 12 is present for each transceiver unit 11. The control and data processing units 12 actuate the transmitters $S_i$ and process the secondary radiation 7, 8 received by the receivers $E_i$ into a measurement signal $A_i$. The control and data processing units 12 are data-connected and signal-connected to evaluation electronics 13. The evaluation electronics 13 comprise an interface 14.

Figure 7:
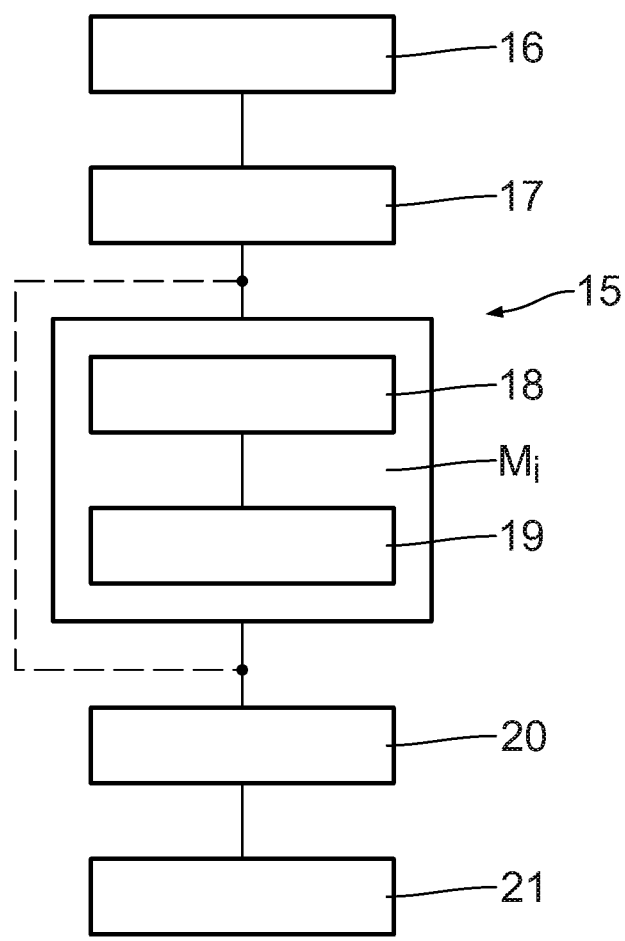
FIG. 7 is a schematic view of a procedure for measuring the layer thickness of an object.

The evaluation electronics 13 are suitable for performing the measurement method outlined above. The individual method steps are schematically illustrated in FIG. 7 as a measurement method 15.

Initially, the transmitters $S_i$ and receivers $E_i$ must be calibrated in a calibration step 16. The phases and amplitudes of the electromagnetic radiation 4 produced by the transmitters $S_i$ are normalized during the calibration. As a result of this, the transmitters $S_i$ can be used in the measurement steps $M_i$ to be performed independently of one another, without a reference signal or synchronization signal being required. To this end, a known calibration object, for example a metal mirror, can be measured in the calibration step 16.

The calibration step 16 is followed by a provision step 17. The object 1 is provided in the provision step 17. Moreover, relevant properties of the object 1 are transmitted to the evaluation electronics 13 by the interface 14. These properties of the object 1 include the refractive index n, the maximum layer thickness $d_{max}$ and the minimum layer thickness $d_{mm}$. For the purposes of entering these properties, the interface 14 is configured as an input module, by means of which the user can directly enter the properties of the object 1. The interface 14 is configured as a data interface in further exemplary embodiments. In these exemplary embodiments, the properties of the object 1 can be directly forwarded to the measuring device 10 in automatic fashion from an upstream production site, where the object 1 is completed. Using the data transmitted in the provision step 17, the evaluation electronics 13 calculate the bandwidth B required for the measurement and a maximum frequency range $\Delta f$. Moreover, the number of measurement steps $M_i$ to be performed can be optimally adapted to the object 1.

At least two measurement steps $M_i$ are performed following the provision step 17. In each measurement step $M_i$, electromagnetic radiation 4 in the frequency band F assigned to the measurement step $M_i$ is radiated on the object 1 and the resultant secondary radiation 7, 8 is detected in a transmission-detection step 18. To this end, the evaluation electronics 13 forward the frequency band $F_i$ required for the measurement step $M_i$ to the control and data processing unit 12 of the transceiver unit 11 with transmitter S that is suitable for the frequency band $F_i$. Then, the electromagnetic radiation 4 is radiated on the object 1 by the transmitter S and the secondary radiation 7, 8 is detected by the receiver $E_i$. The transmission-detection step 18 is followed by a data processing step 19, in which the measurement signal $A_i$ of the measurement step $M_i$ is calculated from the detected secondary radiation 7, 8 by way of the control and data processing unit 12.

After performing all measurement steps the measurement signals $A_i$ ascertained in the data processing step 19 are transmitted to the evaluation electronics 13 in a combination step 20. On account of the known amplitude and phase relationships of the transmitters $S_i$, which were ascertained in the calibration step 16, and the known frequency bands $F_i$, the measurement signals $A_i$ of the individual measurement steps $M_i$ can be combined to form the evaluation signal $A_0$ in the combination step 20. To this end, the measurement signals $A_i$ of the individual measurement steps M are plotted over a common time or frequency axis.

Subsequently, the fundamental frequency $\omega_0$ is determined by fitting the evaluation signal $A_0$ and the layer thickness d is calculated therefrom in an evaluation step 21.

Provision is made for each of the measurement steps $M_i$ to be performed by a different transmitter $S_i$. The electromagnetic radiation 4 generable by each transmitter S includes frequencies f in a frequency band $F_i$ that is associated with the respective measurement step $M_i$ in each case. The measurement setup shown in FIG. 6 is therefore suitable for performing two measurement steps $M_i$ with the transmitters $S_i$ and the respective receivers $E_i$. However, the measuring device 10 has a modular structure. As a result of this, it is possible to add further transmitters $S_i$ and receivers $E_i$, in particular in the form of a transceiver unit 11, to the measuring device 10. This is possible since the transceiver units 11 of the measuring device 10 operate independently of one another. As a result of the modular structure of the measuring device 10, the latter can be ideally adapted to the properties of the object 1 to be measured. Additionally, the number of transceiver units 11 can be increased in order to increase the measurement accuracy.

Figure 8:
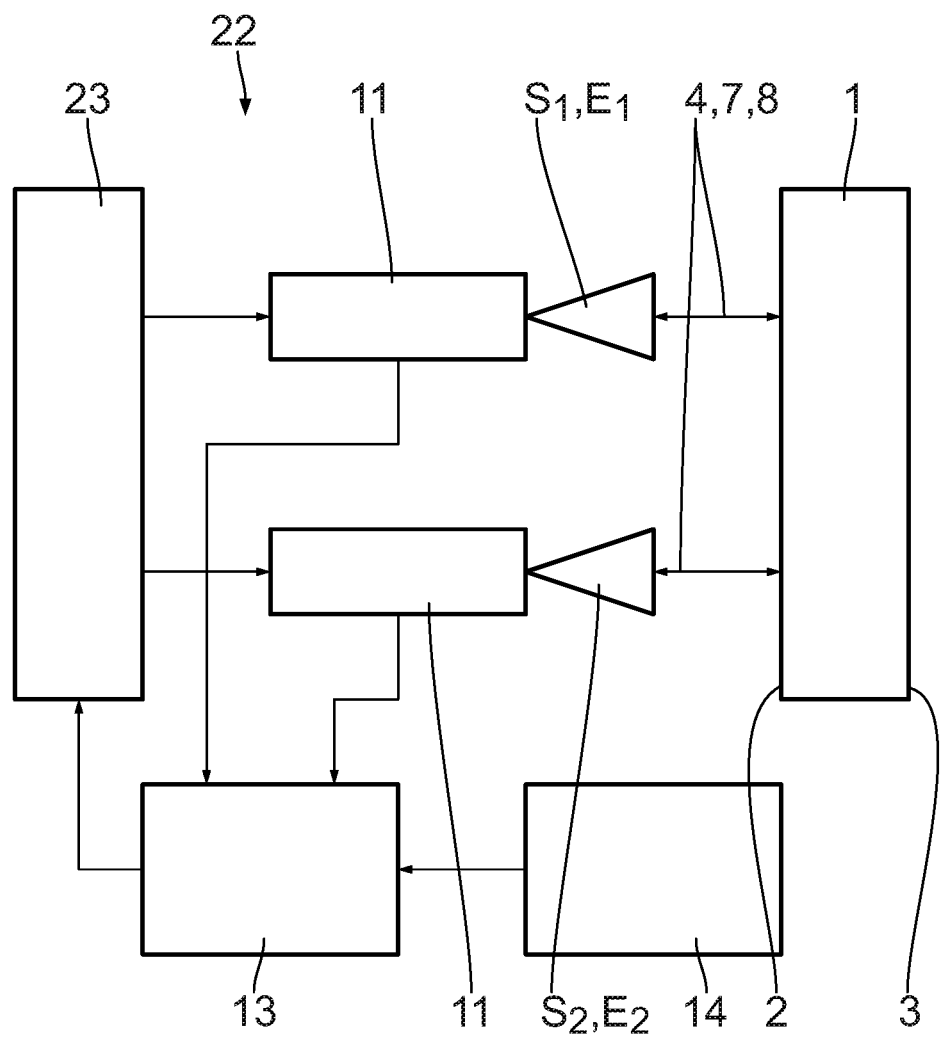
FIG. 8 is a view of a further device for measuring a layer thickness of an object.

FIG. 8 shows a further measurement setup for measuring the layer thickness d on the object 1. Identical components, parameters and method steps are labeled by the same reference signs as in the exemplary embodiments explained with reference to FIGS. 1 to 7, to which reference is made herewith.

The measuring device 22 shown in FIG. 8 only differs from the measuring device 10 in that a common reference oscillator 23 is provided for the transceiver units 11 in place of the independent control and data processing units 12. The reference oscillator 23 synchronizes the phases of the electromagnetic radiation 4 emitted by the transmitters $S_i$ of the transceiver units 11. The reference oscillator 23 is a synchronization unit. Consequently, a calibration of the phase relationships of the transmitters $S_i$ in the calibration step 16 can be dispensed with.

The measuring device 22 also has a modular embodiment. Thus, further or alternative transceiver units 11 can be connected to the reference oscillator 23 and can be actuated by the latter.

In further exemplary embodiments, not illustrated here, the transmitters S and the receivers $E_i$ are not embodied as transceiver units 11 but are connected to the evaluation electronics 13 or to the reference oscillator 23 as separate components.

Measuring the layer thickness d of the object 1 using pulsed electromagnetic radiation 4 is described below with reference to FIG. 9. Identical parameters, components and method steps are labeled by the same reference signs as in the exemplary embodiments described above with reference to FIGS. 1 to 5, to which reference is made herewith.

In the case of the pulsed measurement, electromagnetic radiation 4 is radiated on the object 1 using pulsed radar systems. Here, the resolution of the measurement in the propagation direction 5 of the electromagnetic radiation 4 depends on the temporal extent of the pulses. The temporal extent of the pulses is related in turn to the spectral bandwidth B of the pulses. An electromagnetic pulse can now be described by the following mathematical expression:

$$a(t)\cos(\omega_M t), \quad (7)$$

where a(t) is the pulse amplitude and width and cos ($\omega_M t$) describes the oscillation with the mid-frequency $\omega_M$ of the pulse. Now, the secondary radiation 7, 8 is detected for measurement purposes. On account of the time-of-flight difference between the reflection radiation 7 reflected by the first boundary surface 2 and the emergence radiation 8 reflected by the second boundary surface 3, two reflected pulses emerge with a temporal spacing of T:

$$\tau = \frac{2dn}{c\ \cos e}. \quad (8)$$

The received secondary radiation 7, 8 is therefore described by the following formula in the time domain:

$$A(t)=a(t)\cos[f_m t]+a(t-\tau)\cos[f_M(t-\tau)]. \quad (9)$$

In frequency space, the multiplication becomes a convolution and the time offset becomes a phase shift. Consequently, the following measurement signal A arises in the frequency space for the received secondary radiation 7, 8:

$$A(f)=a(f)\delta(f-f_M)(1+e^{-if\tau}). \quad (10)$$

This corresponds to the spectrum $a(f)\delta(f-f_M)$ multiplied by the factor $(1+e^{-if\tau})$. When calculating the amplitude spectrum |A| over the frequency range, the latter corresponds to a Fabry-Pérot oscillation in the frequency domain:

$$|1+e^{-if\tau}| = 2\cos\left[\frac{\tau}{2}f\right]. \quad (11)$$

The fundamental frequency $\omega_0=2/\tau$ can be determined from the period duration of the Fabry-Pérot oscillation and the layer thickness d can be calculated therefrom in accordance with equation (8).

Figure 9:
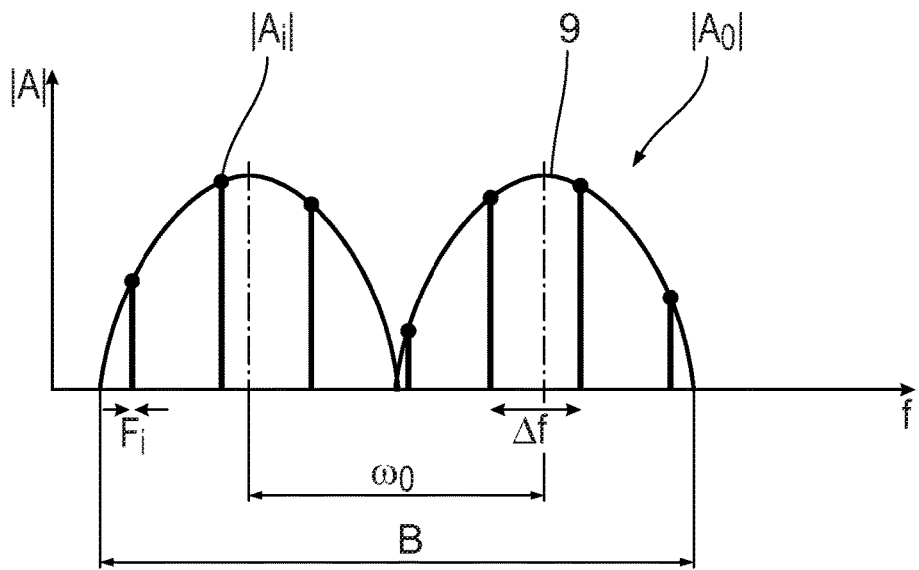
FIG. 9 is a view of an evaluation signal in the frequency range that is reconstructed from different measurement steps.

In FIG. 9, the measurement signal in the form of the amplitude spectrum |A| is plotted over frequency f. If the measurement is performed over the entire bandwidth B, the Fabry-Perot oscillations (see curve 9 in FIG. 9) can be read and the fundamental frequency $\omega_0$ can be ascertained in order to determine the layer thickness d. It is well known that it is necessary to generate extremely short radiation pulses in order to provide a bandwidth B that is sufficient to resolve the smallest layer thickness $d_{min}$ to be measured. The Fabry-Perot oscillations are now reconstructed by performing a plurality of measurement steps $M_i$. To this end, the electromagnetic radiation 4 is radiated in in pulsed fashion in the measurement steps $M_i$. Here, the duration of the radiation pulses is chosen to be so long that the frequency bands $F_i$ associated with each measurement step $M_i$ only cover a fraction of the bandwidth B. The reflected pulses, i.e. the secondary radiation 7, 8, are detected for each measurement step $M_i$, i.e., for each frequency band $F_i$, and the measurement signal $|A_i|$ is ascertained therefrom. In accordance with the frequency bands $F_i$, the measurement signals $|A_i|$ are combined over a common frequency axis f in order to form the evaluation signal $|A_0|$. Then, the curve 9 can be reconstructed by fitting the Fabry-Perot oscillation and the fundamental frequency $\omega_0$ for calculating the layer thickness d can be determined therefrom.

Since the period duration of the Fabry-Perot oscillation is indirectly proportional to the layer thickness d, the frequency spacing, i.e., the fundamental frequency $\omega_0$, of the maxima of the Fabry-Pérot oscillation reduces. In order to ensure a resolution for even the greatest layer thickness $d_{max}$ to be measured, the frequency range $\Delta f$ must be chosen as an equation (6) above.

In a further exemplary embodiment, the electromagnetic radiation 4 of the individual measurement steps $M_i$ is radiated-in in quasi-continuous fashion. This represents the limit case of the pulsed irradiation by the electromagnetic radiation 4, with the time duration of the radiation pulses being (infinitely) long. In this case, the frequency bands F. of the individual measurement steps $M_i$ reduce to a sharp frequency, which corresponds to the mid-frequency $\omega_M$ of the radiation pulses radiated-in in the individual measurement steps M (cf., equation (7)).

In the case where the electromagnetic radiation 4 is radiated-in in quasi-continuous fashion, the measurement signal |A| in the individual measurement steps $M_i$ cannot be determined by a time-of-flight measurement. In this case, provision is made for the measurement signal to be obtained from the interference of the reflection radiation 7 and the emergence radiation 8.

The measurement method described with reference to FIG. 9 also divides into the method steps of the method procedure 15. This method is performable, in particular, using measurement devices that are equivalent to the measurement devices 10, 22. To this end, the transmitters $S_i$ and receivers $E_i$ must be designed for respectively transmitting and receiving pulsed or quasi-continuous radiation 4, 7, 8.

Figure 10:
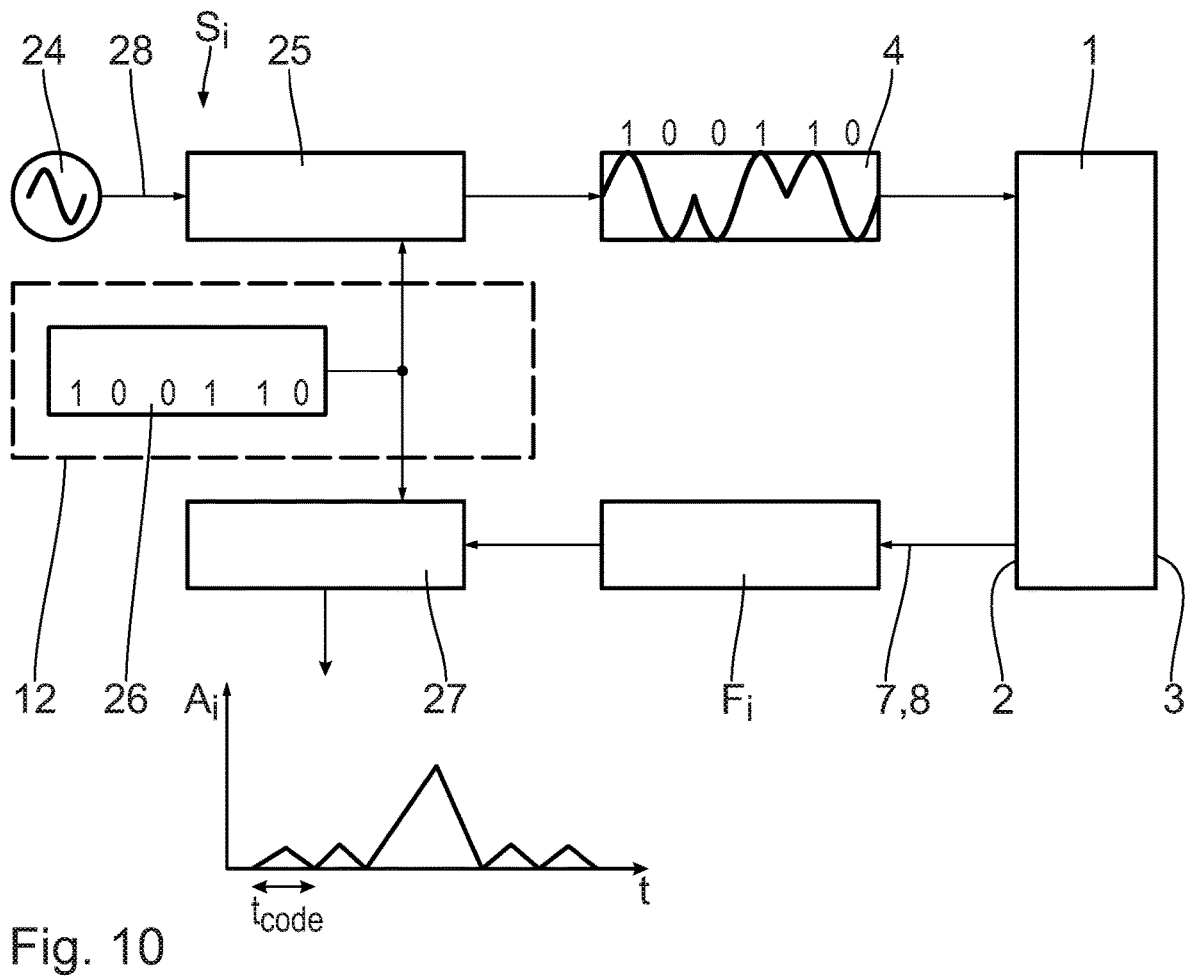
FIG. 10 is a schematic view of the performance of a measurement step by means of phase-modulated electromagnetic radiation.

In a further exemplary embodiment, the electromagnetic radiation 4 is radiated on the object 1 in phase-modulated fashion in each measurement step $M_i$. The measurement principle is illustrated in FIG. 10. Identical components, parameters and method steps are labeled by the same reference signs as in the exemplary embodiments described with reference to FIGS. 1 to 9, to which reference is made herewith.

The transmitter $S_i$ comprises an oscillator 24 that is used to generate continuous radiation 28 with a fixed mid-frequency $\omega_M$. A modulation code 26 is modulated onto the continuous radiation 28 in a phase modulator 25. The modulation code 26 is transmitted to the phase modulator 25 by the control and data processing unit 12 associated with the transmitter $S_i$. The phase modulator 25 modulates a phase φ of the radiated-in electromagnetic radiation 4 over time t according to a function $\varphi_i(t)$. In the illustrated exemplary embodiment, the phase φ is modulated in accordance with the binary modulation code 26, in which a phase jump of π is caused in each case in the case of a change from 0 to 1, or vice versa. The resultant electromagnetic radiation in 4 is shown in FIG. 10 in exemplary fashion. The phase-modulated electromagnetic radiation 4 is radiated on the object 1 and the secondary radiation 7, 8 emanating from the boundary surfaces 2, 3 of the object 1 is detected by the receiver $E_i$. The detected secondary radiation 7, 8 is decoded into a measurement signal A over time t by a phase demodulator 27. To this end, the phase demodulator 27 is likewise fed modulation code 26. The decoded measurement signal $A_i(t)$ corresponds to pulse diagram as obtained in the above-described pulsed measurement. The pulse diagram in the time domain is converted into the measurement signal $A_i$ in frequency space by a Fourier transform. The frequency band $F_i$ covered in measurement step $M_i$ is inversely proportional to the temporal length $t_{code}$ of the modulation code 26, which represents a period duration of the modulation code 26.

The further procedure is analogous to the measurement method with pulsed electromagnetic radiation 4, as described above with reference to FIG. 9. Measurement signals $A_i$ are generated about different mid-frequencies $\omega_M$ generated by the oscillators 24 in different measurement steps $M_i$ and said measurement signals are combined after performing all measurement steps M by virtue of plotting the measurement signals $A_i$ over frequency f, fitting the evaluation signal $|A_0|$ and ascertaining the fundamental frequency $\omega_0$.

All measurement methods discussed above are distinguished in that a measurement result ascertained by electromagnetic radiation 4 with a great bandwidth B can be reconstructed by at least two measurement steps $M_i$, which cover a narrow frequency band $F_i$. Therefore, various exemplary embodiments described above are also combined in further exemplary embodiments not explicitly presented. Thus, provision can be made, for example, for the electromagnetic radiation 4 to be radiated on the object 1 in frequency-modulated fashion in a measurement step $M_i$ and in phase-modulated fashion in the further measurement steps $M_i$. The various exemplary embodiments can be combined as desired for different measurement steps $M_i$.

The measurement method 15 and the measurement devices 10, 22 are designed for measuring the layer thickness d by means of a reflection measurement. Alternatively, a transmission measurement may also be performed. Here, the secondary radiation only passes through the object 1 once. Reference radiation that does not pass through the object 1 can be superposed on the secondary radiation in order thus to determine the measurement signal $A_i$ of each measurement step $M_i$. In this case, formulae (2) and (6) must be adapted accordingly for the bandwidth B with a frequency range Δf.

While specific embodiments of the invention have been shown and described in detail to illustrate the application of the principles of the invention, it will be understood that the invention may be embodied otherwise without departing from such principles.

The invention claimed is:

1. A method for measuring a layer thickness of an object, the method comprising the following steps:
    providing an object having two boundary surfaces spaced apart by a layer thickness;
    performing at least two measurement steps, wherein, in each case, electromagnetic radiation with frequencies in a frequency band associated with a respective measurement step is radiated on the object, wherein the frequency bands of the individual measurement steps are different portions of a bandwidth, and secondary radiation emanating from the two boundary surfaces of the object is detected and a measurement signal is ascertained;
    combining measurement signals of the at least two measurement steps according to the respective frequency bands in order to form an evaluation signal; and
    determining a fundamental frequency of the evaluation signal in order to calculate the layer thickness.

2. The method as claimed in claim 1, wherein the electromagnetic radiation is radiated on the object in pulsed fashion in at least one of the two measurement steps.

3. The method as claimed in claim 1, wherein the frequency of the electromagnetic radiation is modulated over time according to a function in at least one of the two measurement steps, wherein the function maps the frequency band of the respective measurement step onto a time window.

4. The method as claimed in claim 1, wherein a phase of the electromagnetic radiation radiated-in is modulated over time according to a function in at least one of the two measurement steps.

5. The method as claimed in claim 1, wherein the frequency bands of individual measurement steps do not overlap.

6. The method as claimed in claim 1, wherein the bandwidth is defined about a bandwidth mid-frequency in a range of 50 GHz to 1500 GHz.

7. The method as claimed in claim 1, wherein the following applies to the bandwidth B:

$$B \geq \frac{c \cos e}{2d_{min}n},$$

where c is a speed of light, n is a refractive index of the object, e is a propagation angle at which the electromagnetic radiation propagates within the object and $d_{min}$ is a smallest layer thickness to be measured.

8. The method as claimed in claim 1, wherein the following applies to each frequency range $\Delta f$ that does not belong to any frequency band of a measurement step within the bandwidth B:

$$\Delta f < \frac{c \cos e}{2d_{max}n},$$

where c is a speed of light, n is a refractive index of the object, e is a propagation angle at which the electromagnetic radiation propagates within the object and $d_{max}$ is a greatest layer thickness to be measured.

9. The method as claimed in claim 1, wherein respectively one transmitter for emitting electromagnetic radiation in a respective frequency band and respectively one receiver for the secondary radiation are provided for carrying out each measurement step.

10. The method as claimed in claim 9, wherein the transmitters are calibrated before the measurement.

11. The method as claimed in claim 9, wherein the transmitters are actuated in synchronized fashion.

12. A device for measuring a layer thickness of an object, the device comprising:
- at least two transmitters for emitting electromagnetic radiation with, in each case, frequencies in a set frequency band, wherein the frequency bands of individual transmitters are different portions of a bandwidth;
- at least one receiver for electromagnetic radiation with frequencies within the bandwidth; and
- evaluation electronics, wherein the evaluation electronics are configured to perform a measurement method comprising the following steps:
  - performing a measurement step by each transmitter, wherein, in each case, electromagnetic radiation in the respective frequency band is radiated on the object by the respective transmitter, and secondary radiation emanating from two boundary surfaces of the object that are spaced apart by a layer thickness is detected as a measurement signal by the at least one receivers;
  - combining the measurement signals of the measurement steps according to the respective frequency bands in order to form an evaluation signal; and
  - determining a fundamental frequency of the evaluation signal in order to calculate the layer thickness.

13. The device as claimed in claim 12, wherein the transmitters are coupled by a synchronization unit.

14. The device of as claimed in claim 12, wherein the evaluation electronics comprise an interface for entering properties of the object.

15. The device as claimed in claim 12, wherein the device comprises a modular design.

* * * * *